(12) United States Patent
Krutikova et al.

(10) Patent No.: US 12,334,577 B2
(45) Date of Patent: Jun. 17, 2025

(54) MOBILE POWER SUPPLY

(71) Applicant: MILWAUKEE ELECTRIC TOOL CORPORATION, Brookfield, WI (US)

(72) Inventors: Maria Krutikova, Wauwatosa, WI (US); Max Karbin, Milwaukee, WI (US); Anthony Graykowski, Belgium, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 590 days.

(21) Appl. No.: 17/736,197

(22) Filed: May 4, 2022

(65) Prior Publication Data

US 2022/0359943 A1 Nov. 10, 2022

Related U.S. Application Data

(60) Provisional application No. 63/186,549, filed on May 10, 2021.

(51) Int. Cl.
*H01M 50/247* (2021.01)
*B62B 5/06* (2006.01)

(52) U.S. Cl.
CPC .......... *H01M 50/247* (2021.01); *B62B 5/064* (2013.01); *B62B 5/067* (2013.01); *H01M 2220/30* (2013.01)

(58) Field of Classification Search
CPC .......... B62B 5/06; B62B 5/064; B62B 5/067; H01M 2220/30; H01M 50/247
See application file for complete search history.

(56) References Cited

U.S. PATENT DOCUMENTS

| | | | | |
|---|---|---|---|---|
| 3,816,873 | A | * | 6/1974 | Thorud ............... B62B 5/06 403/324 |
| 5,077,513 | A | * | 12/1991 | Dea ............... B60R 16/0235 320/115 |
| 6,053,514 | A | | 4/2000 | Su |
| 6,299,195 | B1 | * | 10/2001 | Chan ............... B62B 3/02 280/DIG. 6 |
| 6,468,048 | B1 | | 10/2002 | Burkholder et al. |

(Continued)

FOREIGN PATENT DOCUMENTS

| CN | 201187345 Y | 1/2009 |
|---|---|---|
| CN | 100523452 C | 8/2009 |

(Continued)

OTHER PUBLICATIONS

International Search Report and Written Opinion for Application No. PCT/US2022/027579 dated Aug. 16, 2022 (10 pages).

*Primary Examiner* — Erez Gurari
(74) *Attorney, Agent, or Firm* — Michael Best & Friedrich LLP

(57) ABSTRACT

A mobile power supply includes a frame, at least one battery pack supported by the frame, a clamp assembly coupled to the frame, and a handle removably attached to the frame. The handle has two elongate members that are spaced apart from one another and a cross-member extending between the two elongate members. The clamp assembly is configured to capture the cross-member with the handle in an operation configuration, release the cross-member to move the handle from operation configuration to a storage configuration, and capture the cross-member with the handle in the storage configuration.

19 Claims, 19 Drawing Sheets

(56) References Cited

U.S. PATENT DOCUMENTS

| | | |
|---|---|---|
| 6,532,990 B1 | 3/2003 | Wood et al. |
| 6,532,991 B1 | 3/2003 | Wood et al. |
| 6,655,925 B1 | 12/2003 | Robenalt et al. |
| RE38,436 E | 2/2004 | Su |
| D491,197 S | 6/2004 | Stilwell et al. |
| 6,742,995 B1 | 6/2004 | Wood et al. |
| 6,923,627 B1 | 8/2005 | Wood et al. |
| 6,935,642 B1 | 8/2005 | Craig et al. |
| 7,025,573 B1 | 4/2006 | Hardin et al. |
| 7,089,889 B2 | 8/2006 | Johnson et al. |
| 7,163,382 B1 | 1/2007 | Stilwell et al. |
| 7,413,414 B2 | 8/2008 | Wood et al. |
| 7,458,784 B2 | 12/2008 | Vos et al. |
| 7,462,009 B2 | 12/2008 | Hartmann et al. |
| 7,475,888 B2 | 1/2009 | Craig et al. |
| 7,597,340 B2 | 10/2009 | Hirose et al. |
| 7,832,991 B2 | 11/2010 | Wood et al. |
| 7,896,368 B2 | 3/2011 | Craig et al. |
| 7,909,584 B2 | 3/2011 | Etter et al. |
| 8,296,909 B2 | 10/2012 | Takemura |
| 8,302,976 B2 | 11/2012 | Okabe |
| 8,303,261 B1 | 11/2012 | Hawkins |
| 8,303,262 B1 | 11/2012 | Hawkins |
| 8,313,309 B1 | 11/2012 | Hawkins |
| 8,616,159 B1 | 12/2013 | Hawkins |
| 8,683,656 B2 | 4/2014 | Mizuguchi et al. |
| 8,695,167 B2 | 4/2014 | Mizuguchi et al. |
| 8,814,535 B2 | 8/2014 | Etter et al. |
| 8,844,948 B1 * | 9/2014 | Tanner .................. B62B 5/067 |
| | | 135/66 |
| 8,935,995 B1 | 1/2015 | Hawkins |
| 9,457,822 B2 | 10/2016 | Rumao et al. |
| 10,337,399 B2 | 7/2019 | Rumao et al. |
| 10,583,853 B2 | 3/2020 | Brilhante et al. |
| 11,198,459 B1 * | 12/2021 | Dudley .................. B62B 1/12 |
| 2005/0211011 A1 * | 9/2005 | Victor .................... B62B 5/06 |
| | | 74/551.1 |
| 2006/0104835 A1 | 5/2006 | Etter et al. |
| 2006/0290084 A1 * | 12/2006 | Sodemann ............ B08B 3/026 |
| | | 280/47.17 |
| 2007/0193536 A1 | 8/2007 | Johnson et al. |
| 2009/0053076 A1 | 2/2009 | Vos et al. |
| 2011/0078877 A1 | 4/2011 | Risner |
| 2011/0175307 A1 * | 7/2011 | Tsai ...................... B62B 1/002 |
| | | 280/47.18 |
| 2011/0185539 A1 * | 8/2011 | Mattson ................ B62B 5/064 |
| | | 16/429 |
| 2011/0308040 A1 * | 12/2011 | Mizuguchi ............ B62B 5/067 |
| | | 16/110.1 |
| 2011/0308045 A1 | 12/2011 | Mizuguchi et al. |
| 2012/0042477 A1 | 2/2012 | Junk et al. |
| 2013/0193673 A1 * | 8/2013 | Vanderberg ............ B62B 1/12 |
| | | 280/655 |
| 2014/0217689 A1 * | 8/2014 | Rumao ................. F02B 63/044 |
| | | 280/47.33 |
| 2014/0300079 A1 * | 10/2014 | Rhodes .................... A61G 5/06 |
| | | 280/304.1 |
| 2018/0151017 A1 * | 5/2018 | Costa ..................... G07F 19/20 |
| 2020/0156686 A1 | 5/2020 | Brilhante et al. |
| 2020/0361511 A1 | 11/2020 | Bradley et al. |
| 2021/0229723 A1 * | 7/2021 | Sa ........................... B62B 5/06 |
| 2022/0289261 A1 * | 9/2022 | Gibson .................. B62B 1/20 |
| 2022/0371644 A1 * | 11/2022 | Peloquin ........... A63B 21/4035 |
| 2024/0253678 A1 * | 8/2024 | Beckwith ............... B62B 5/067 |

FOREIGN PATENT DOCUMENTS

| | | |
|---|---|---|
| CN | 204186469 U | 3/2015 |
| CN | 210707496 U | 6/2020 |
| CN | 210971240 U | 7/2020 |
| CN | 211166957 U | 8/2020 |
| CN | 211809653 U | 10/2020 |
| EP | 2543481 A1 | 1/2013 |
| JP | H07184754 A | 7/1995 |
| JP | H09240486 A | 9/1997 |

* cited by examiner

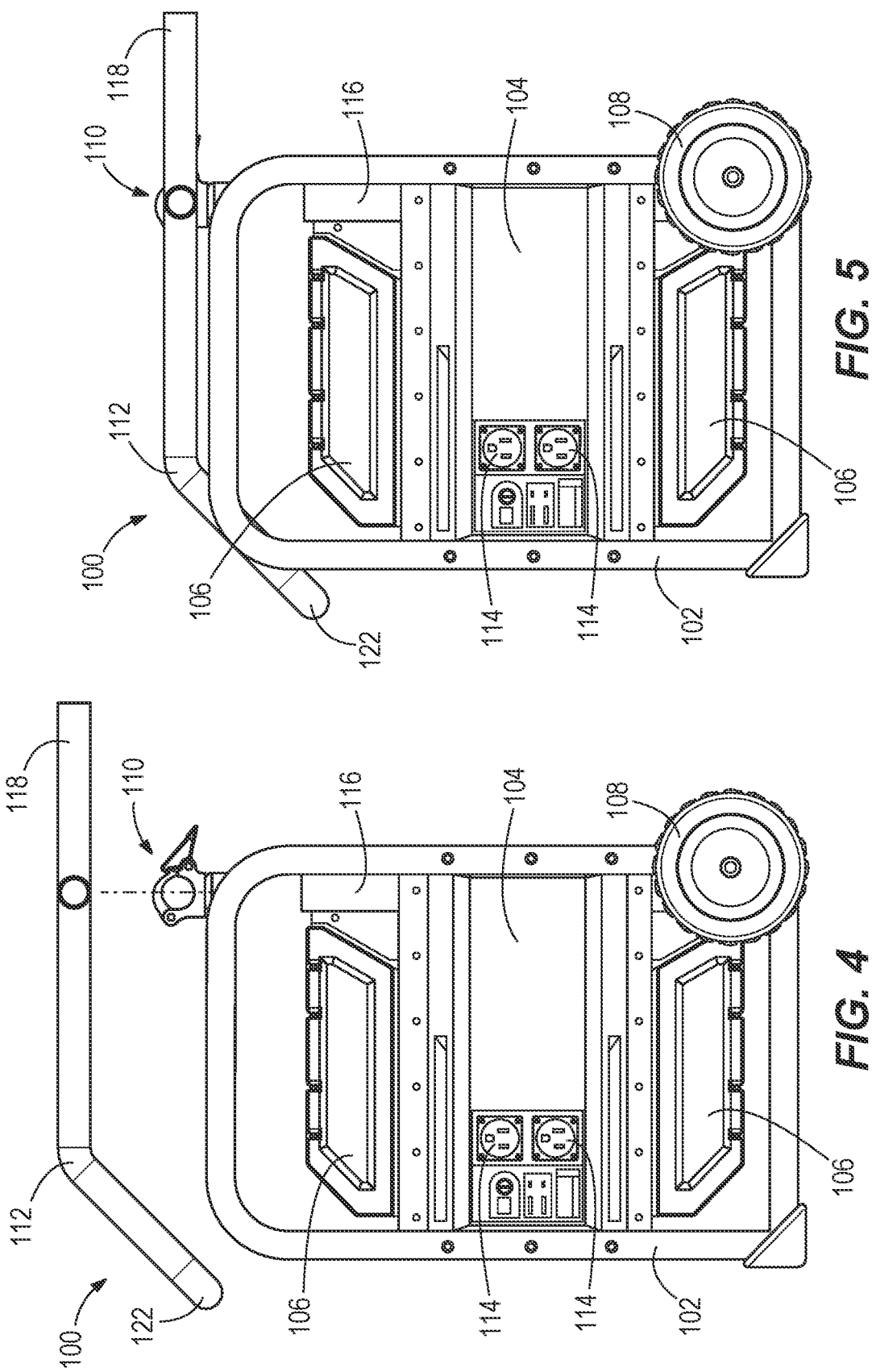

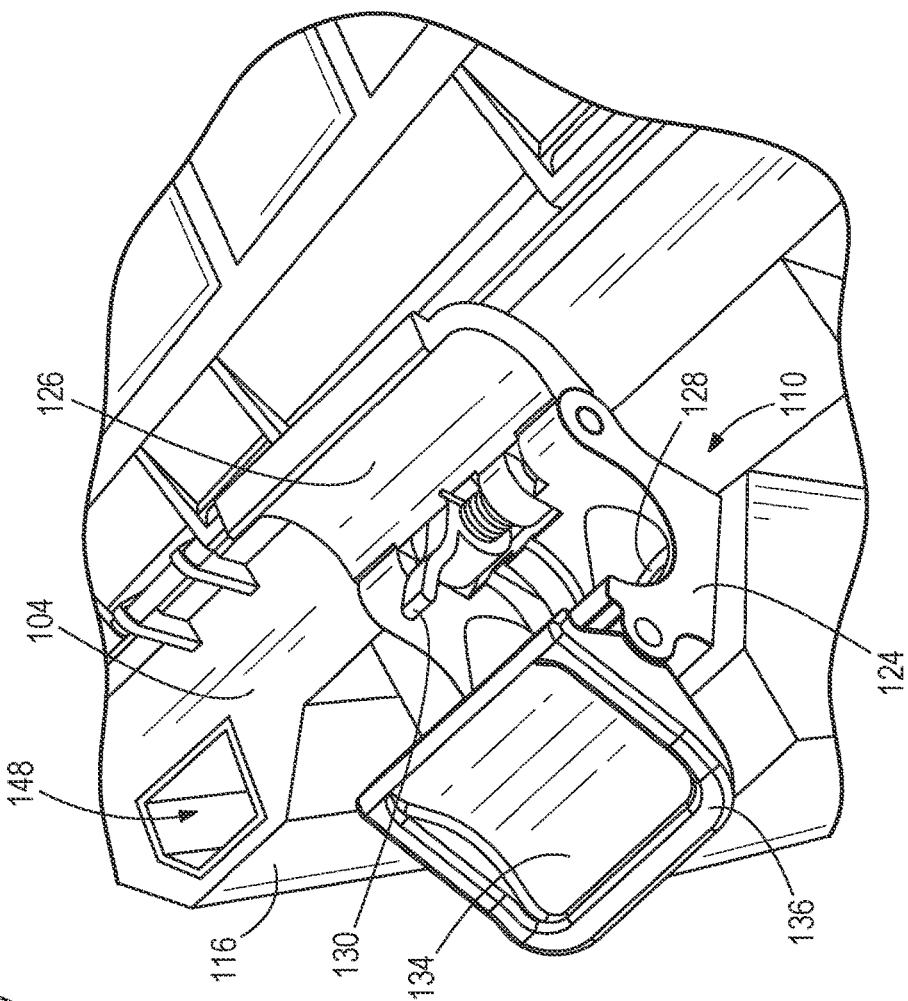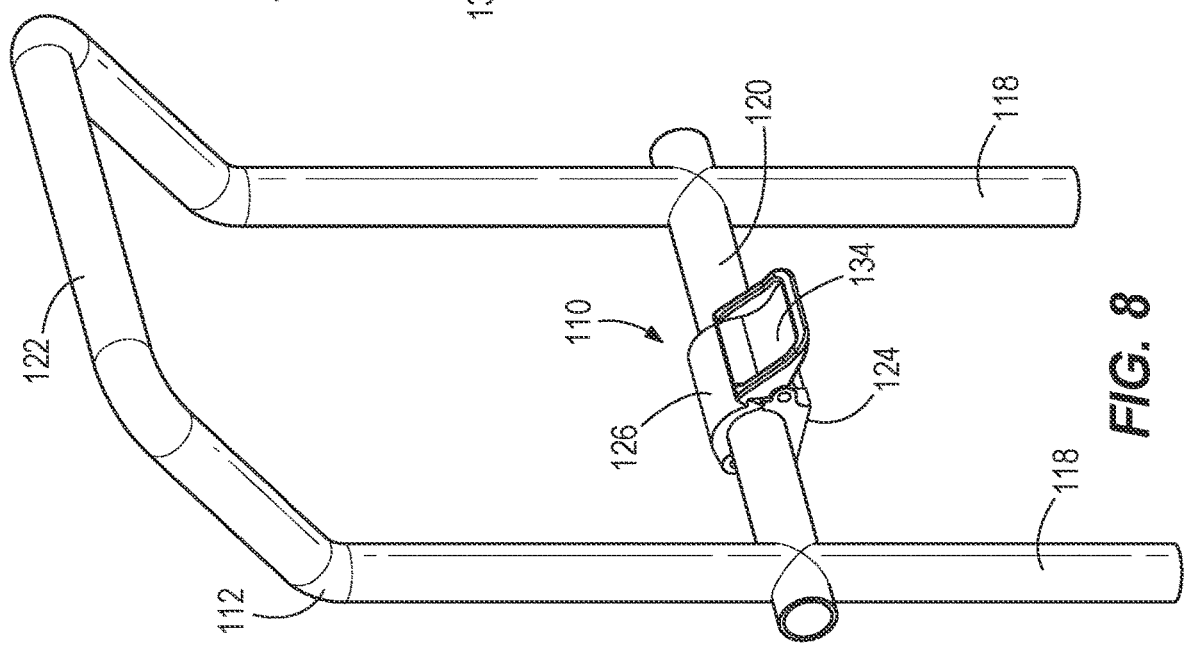

MOBILE POWER SUPPLY

CROSS-REFERENCE TO RELATED APPLICATIONS

This application claims priority to co-pending U.S. Provisional Patent Application No. 63/186,549 filed on May 10, 2021, the entire contents of which are incorporated herein by reference.

FIELD OF THE DISCLOSURE

The present disclosure relates to power supplies. More particularly, the present disclosure relates to a mobile power supply with a removable handle.

BACKGROUND

Mobile power supplies include a handle that allow the mobile power supply to be easily transported. The handle may be moveable to allow the mobile power supply to be in an operation configuration or a storage configuration.

SUMMARY

The disclosure provides, in one aspect, a mobile power supply including a frame, at least one battery pack supported by the frame, a clamp assembly coupled to the frame, and a handle removably attached to the frame. The handle has two elongate members that are spaced apart from one another and a cross-member extending between the two elongate members. The clamp assembly is configured to capture the cross-member with the handle in an operation configuration, release the cross-member to move the handle from operation configuration to a storage configuration, and capture the cross-member with the handle in the storage configuration.

The disclosure provides, in another aspect, a mobile power supply including a frame, at least one battery pack supported by the frame, a clamp assembly having a base coupled to the frame, and a handle positionable in an operation configuration and a storage configuration relative to the frame. The handle includes a cross-member. The clamp assembly is configured to removably capture the cross-member of the handle with the handle in each of the operation configuration and the storage configuration. The handle must be completely removed from the clamp assembly in order to move from the storage configuration to the operation configuration.

The disclosure provides, in yet another aspect, a method of using a mobile power supply. The method includes actuating a user engagement portion of a clamp assembly and removing a portion of a handle from the clamp assembly. The method further includes removing the handle from a frame of the mobile power supply and rotating the handle relative to and separate from the frame. The method also includes recapturing the portion of the handle with the clamp assembly.

Features and aspects of the disclosure will become apparent by consideration of the following detailed description and accompanying drawings.

BRIEF DESCRIPTION OF THE DRAWINGS

FIG. 4 is a side elevation view of the mobile power supply of FIG. 1 with the handle removed from the frame and rotated compared to FIG. 2.

FIG. 5 is a side elevation view of the mobile power supply of FIG. 1 with the handle in a first storage configuration.

FIG. 8 is a rear perspective view of the handle and clamp assembly of the mobile power supply of FIG. 1.

FIG. 9 is a detailed rear perspective view of a clamp assembly on a mobile power supply, according to embodiments disclosed herein.

DETAILED DESCRIPTION

Figure 1:
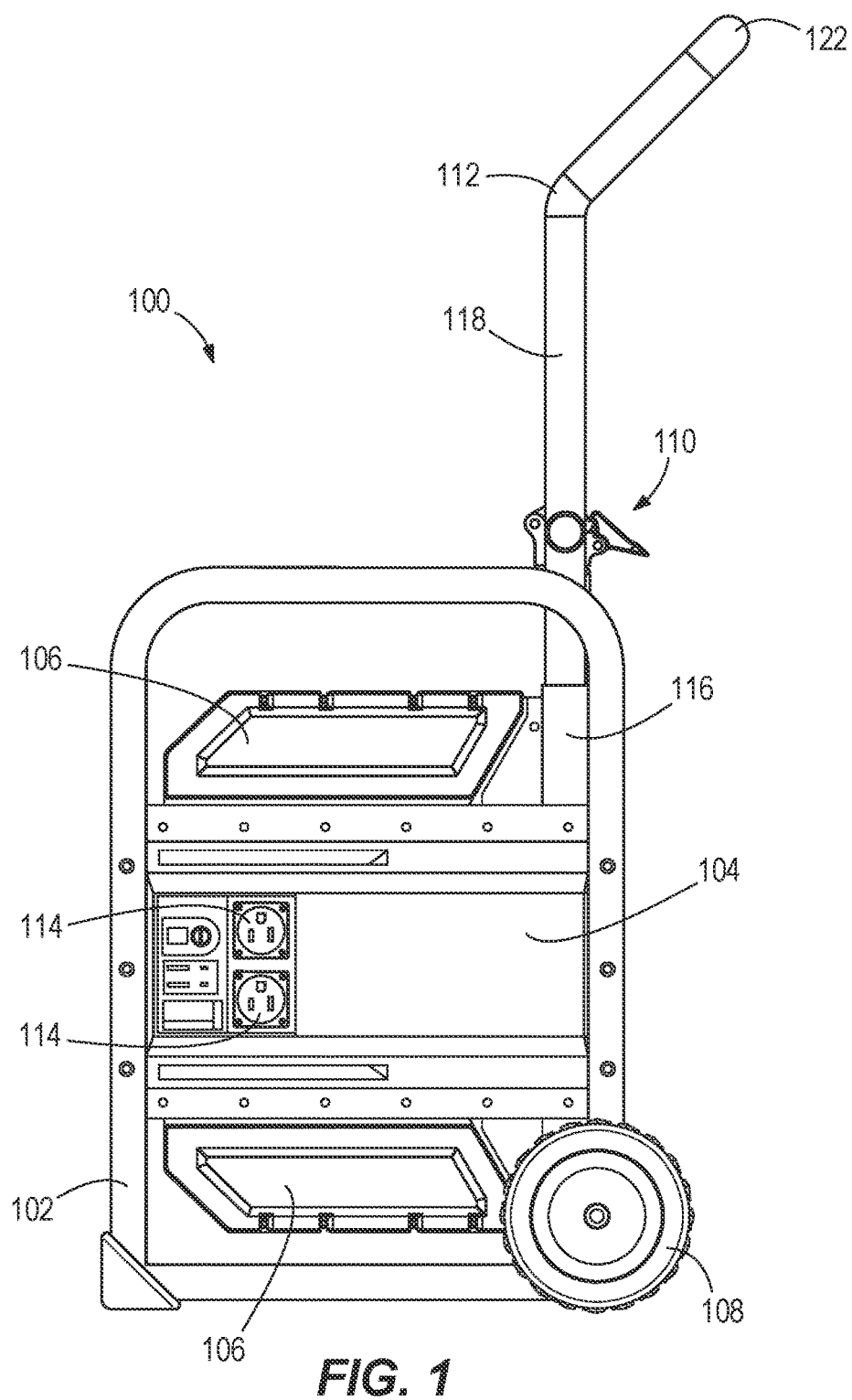
FIG. 1 is a side elevation view of a mobile power supply with the handle in an operation configuration, according to embodiments disclosed herein.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting.

With reference to FIG. 1, an embodiment of a mobile power supply 100 is shown. The mobile power supply 100 includes a frame 102, a body 104 supported by the frame 102, a plurality of battery packs 106 removably coupled to the body 104, wheels 108 coupled to the frame 102, a clamp assembly 110 coupled to the frame 102, and a handle 112 removably coupled to the frame 102 and clamp assembly 110.

The battery packs 106 are slidably coupled to the body 104 and, therefore, are supported by the frame 102. The battery packs 106 can be of any type, but are preferably rechargeable batteries configured to supply power via plugs 114 to various power consuming devices, such as power tools and the like.

Although the clamp assembly 110 is shown coupled directly to the frame 102, some embodiments may include the clamp assembly 110 coupled to, for instance, the body 104 and, therefore, coupled indirectly to the frame 102. Similarly, although the handle 112 is shown coupled to the clamp assembly 110 and mounts 116 (discussed more below), some embodiments may include the handle 112 coupled to the body 104 or some other intermediate component to be indirectly coupled to the frame 102.

Figure 7:
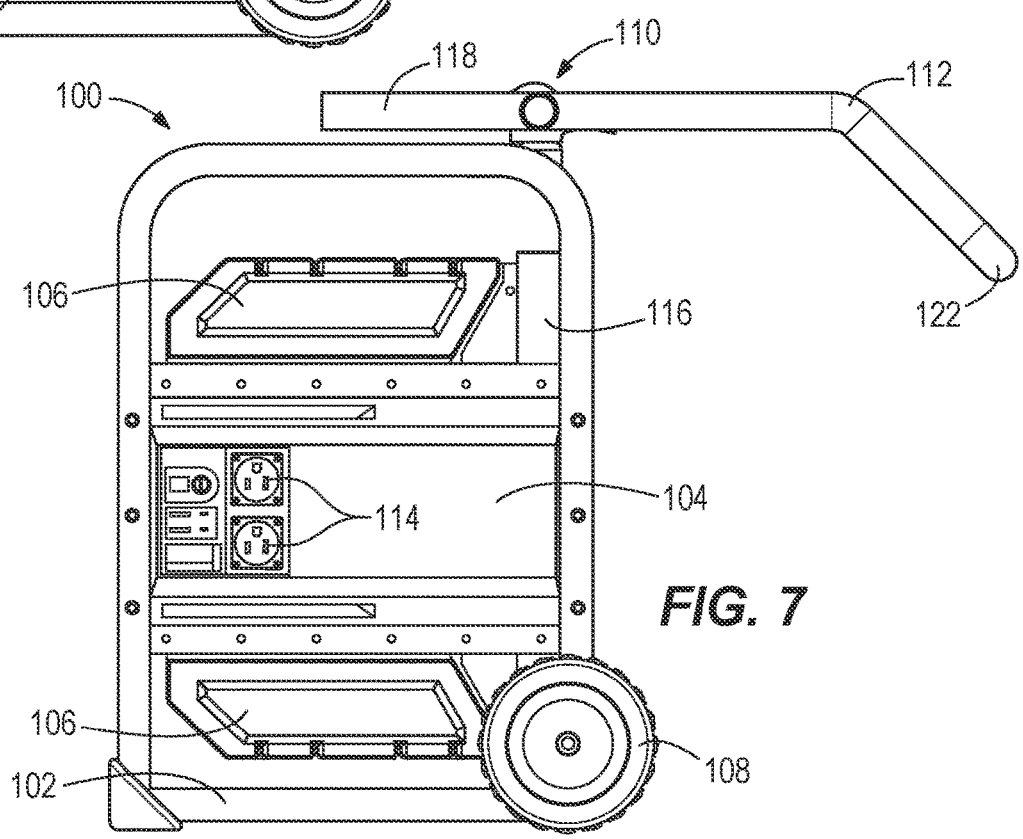
FIG. 7 is a side elevation view of the mobile power supply of FIG. 1 with the handle in a second storage configuration.

The handle 112 is removable and, therefore, may be positioned in at least two configurations. The handle 112 is shown in an operation configuration in FIG. 1, a first storage configuration in FIG. 5, and a second storage configuration in FIG. 7. To switch the handle 112 between the various configurations, the handle 112 must be removed completely from the rest of the mobile power supply 100. Namely, the handle 112 must be released from the clamp assembly 110 and withdrawn from the mounts 116, as shown in FIGS. 2-4 and 6.

Figure 3:
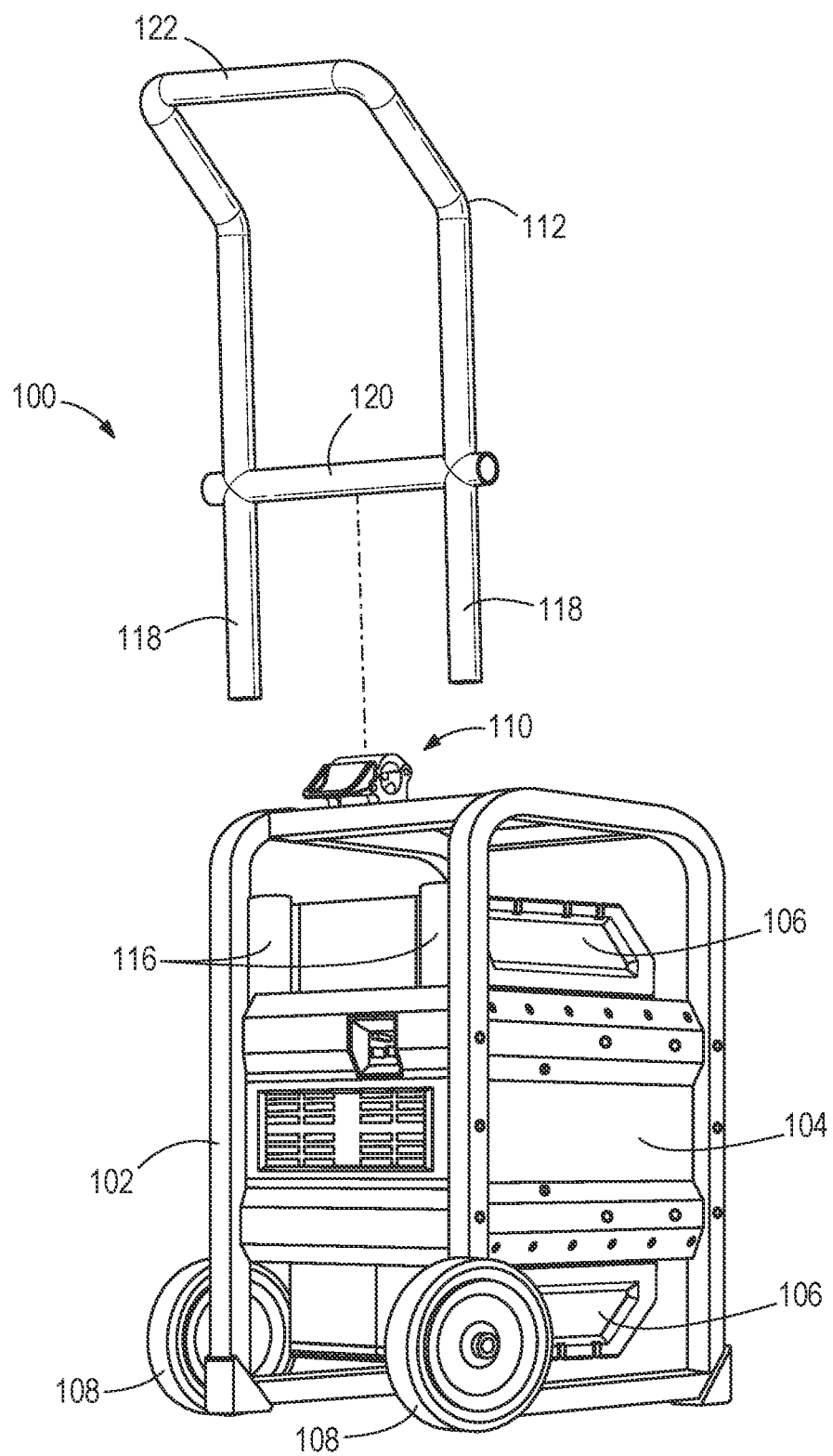
FIG. 3 is a rear perspective view of the mobile power supply of FIG. 1 with the handle removed from the frame.
Figure 6:
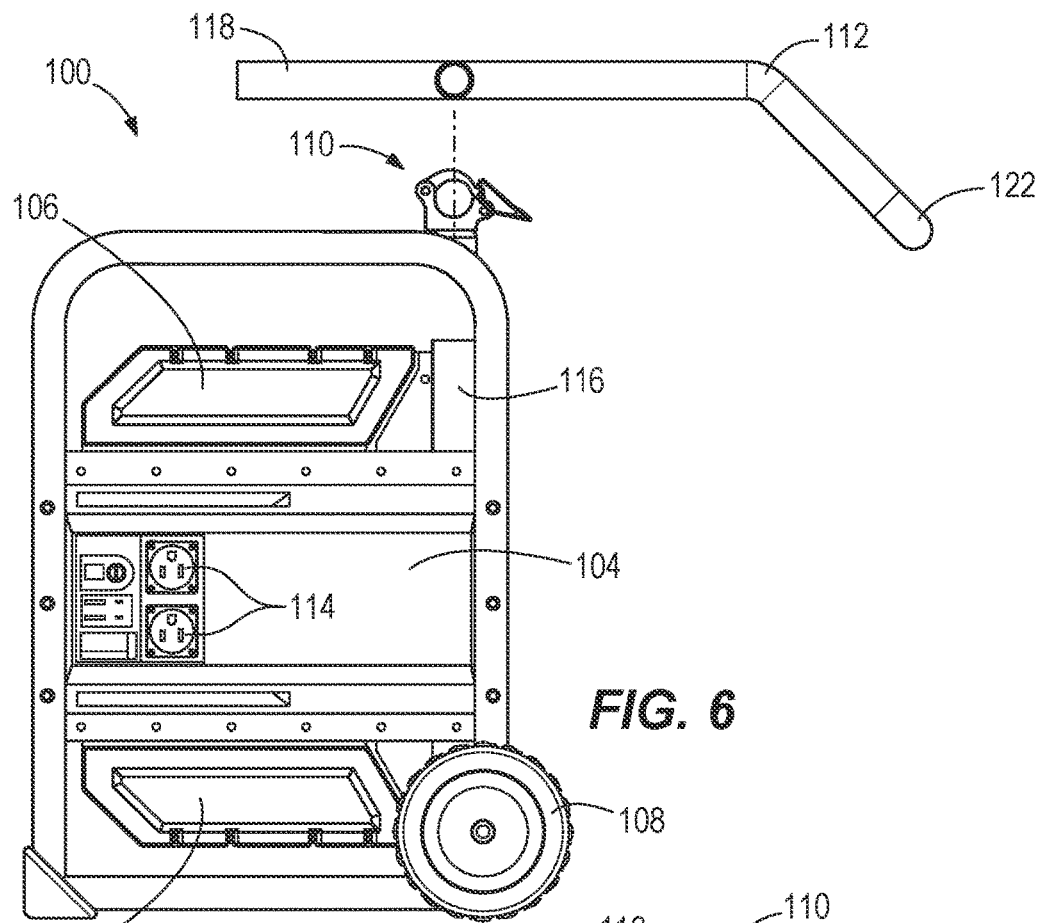
FIG. 6 is a side elevation view of the mobile power supply of FIG. 1 with the handle removed from the frame and rotated compared to FIGS. 2 and 4.

With reference to FIGS. 3 and 8, the handle 112 includes two elongate members 118. In the illustrated embodiment, the elongate members 118 are parallel to each other. The handle 112 further includes a cross-member 120 extending between and connecting the two elongate members 118. In the illustrated embodiment, the cross-member 120 is perpendicular to the two elongate members 118. As shown in several of the FIGS., the cross-member 120 is removably captured in the clamp assembly 110 (discussed more below). The handle 112 also includes a gripping portion 122 disposed on an end of the handle 112 that is opposite the free ends of the two elongate members 118. In the illustrated embodiment, the gripping portion 122 is a single bar that is perpendicular to the two elongate members 118 and, therefore, parallel to the cross-member 120. The gripping portion 122 is closer to the frame 102 with the handle 112 in the first and second storage configurations than with the handle 112 in the operation configuration. In the illustrated embodiment, the handle 112 is in an upright orientation in the operation configuration and is in a horizontal orientation in the first and second storage configurations. In this manner, the overall height of the mobile power supply 100 is greater with the handle 112 in the operation configuration than in the first and second storage configurations. The mobile power supply 100, therefore, can be operated similar to a dolly when transporting the mobile power supply 100 by hand. The mobile power supply 100 can also be stored in relatively smaller spaces, such as a bed of a truck equipped with a bed cover, with the handle 112 in either of the first and second storage configurations.

Figure 10:
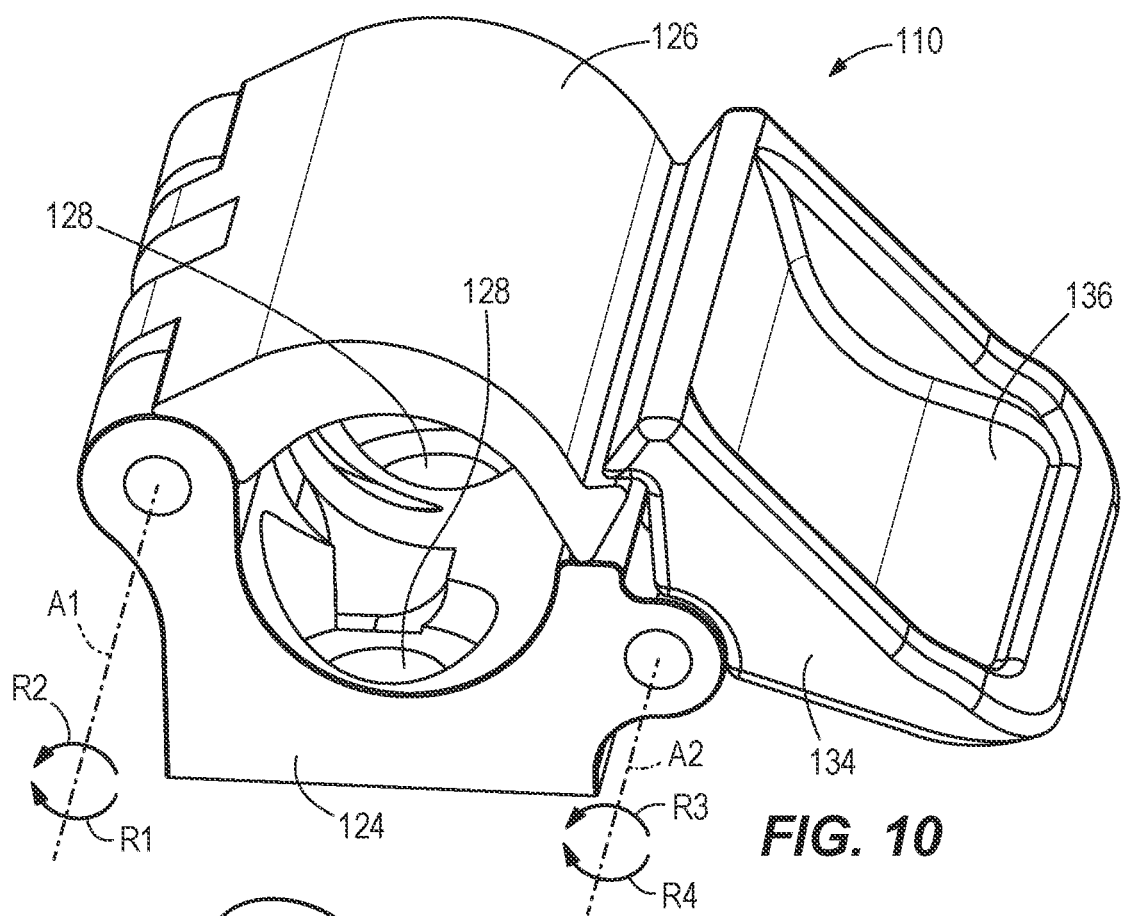
FIG. 10 is a side perspective view of the clamp assembly of the mobile power supply of FIG. 1.
Figure 11:
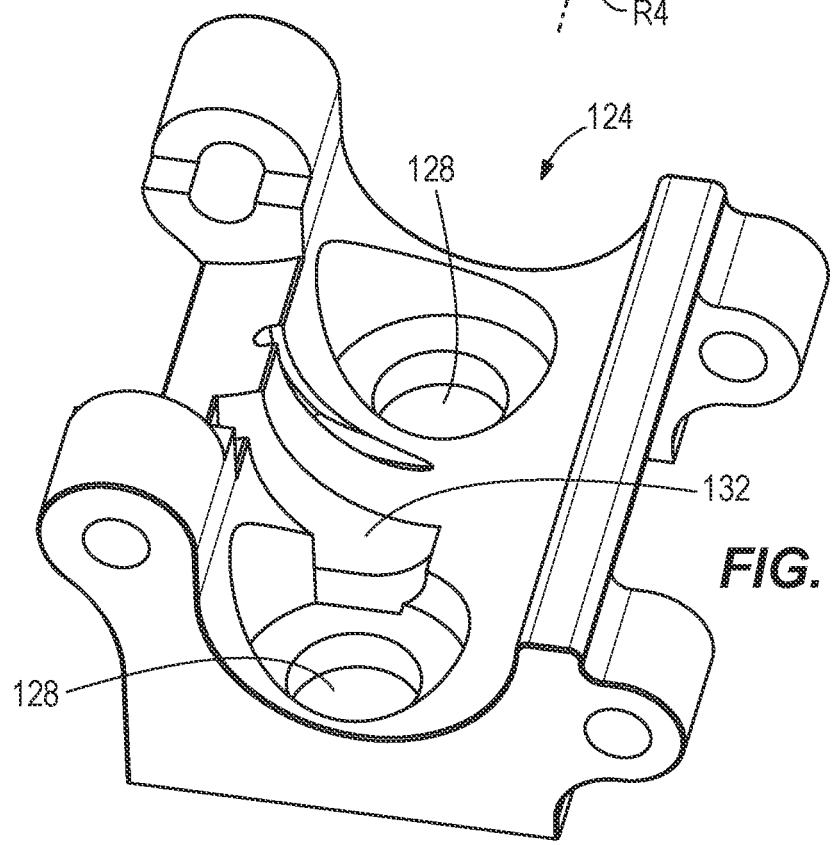
FIG. 11 is a base of the clamp assembly of FIG. 10.

As shown in FIGS. 9 and 10, the clamp assembly 110 includes a base 124 and a clamp arm 126 pivotably connected to the base 124. The clamp assembly 110 is configured to capture the cross-member 120 between the base 124 and the clamp arm 126. As shown best in FIG. 11, the base 124 of the clamp assembly 110 includes at least one mounting portion 128, illustrated in this embodiment as two through holes for receiving a bolt, screw, or other fastener therethrough. In this manner, the base 124 of the clamp assembly 110 can be coupled to the frame 102 either directly or indirectly via another structure, such as the body 104.

Figure 12:
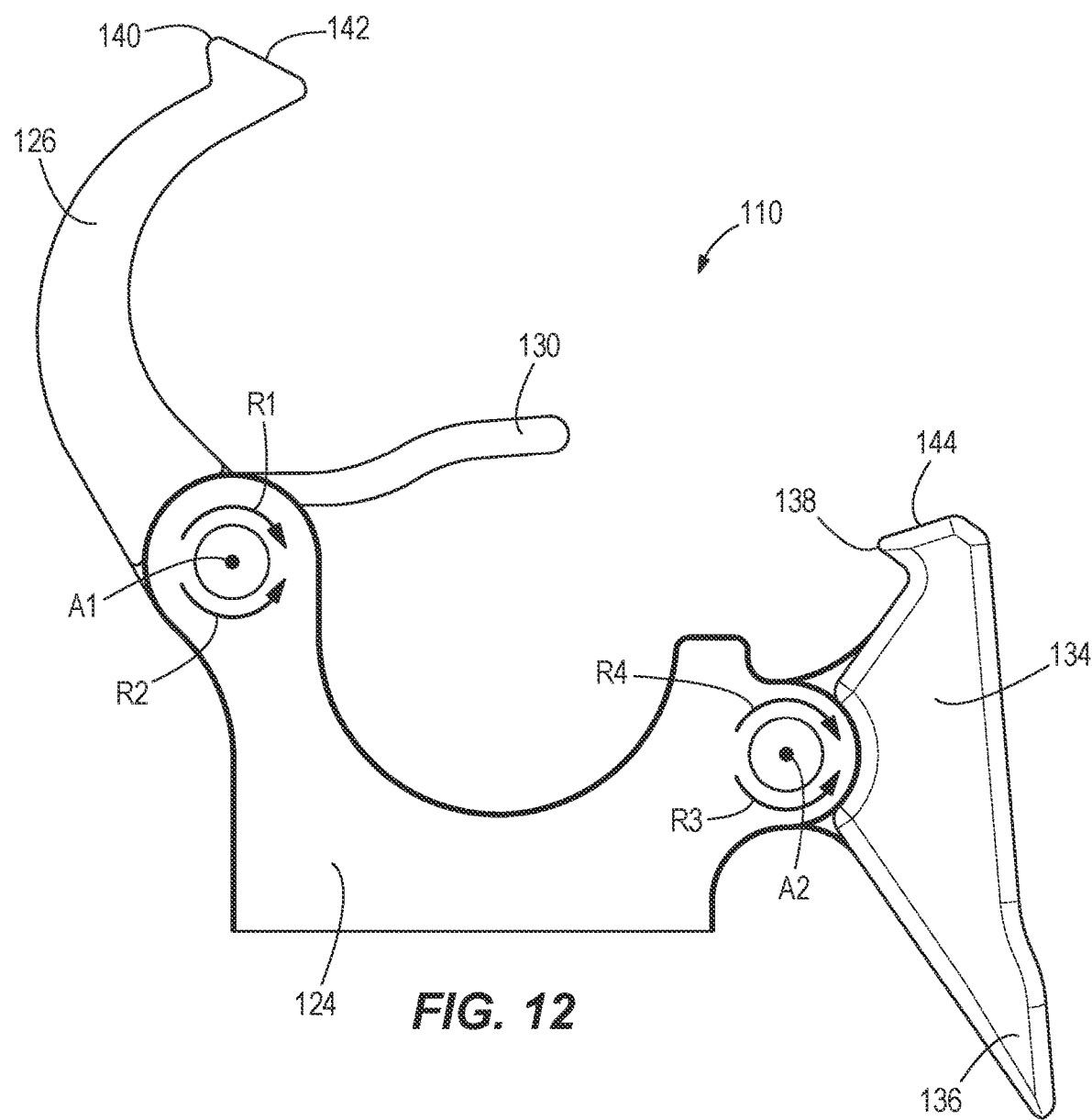
FIG. 12 is a side elevation view of the clamp assembly of FIG. 10 in an open position.
Figure 13:
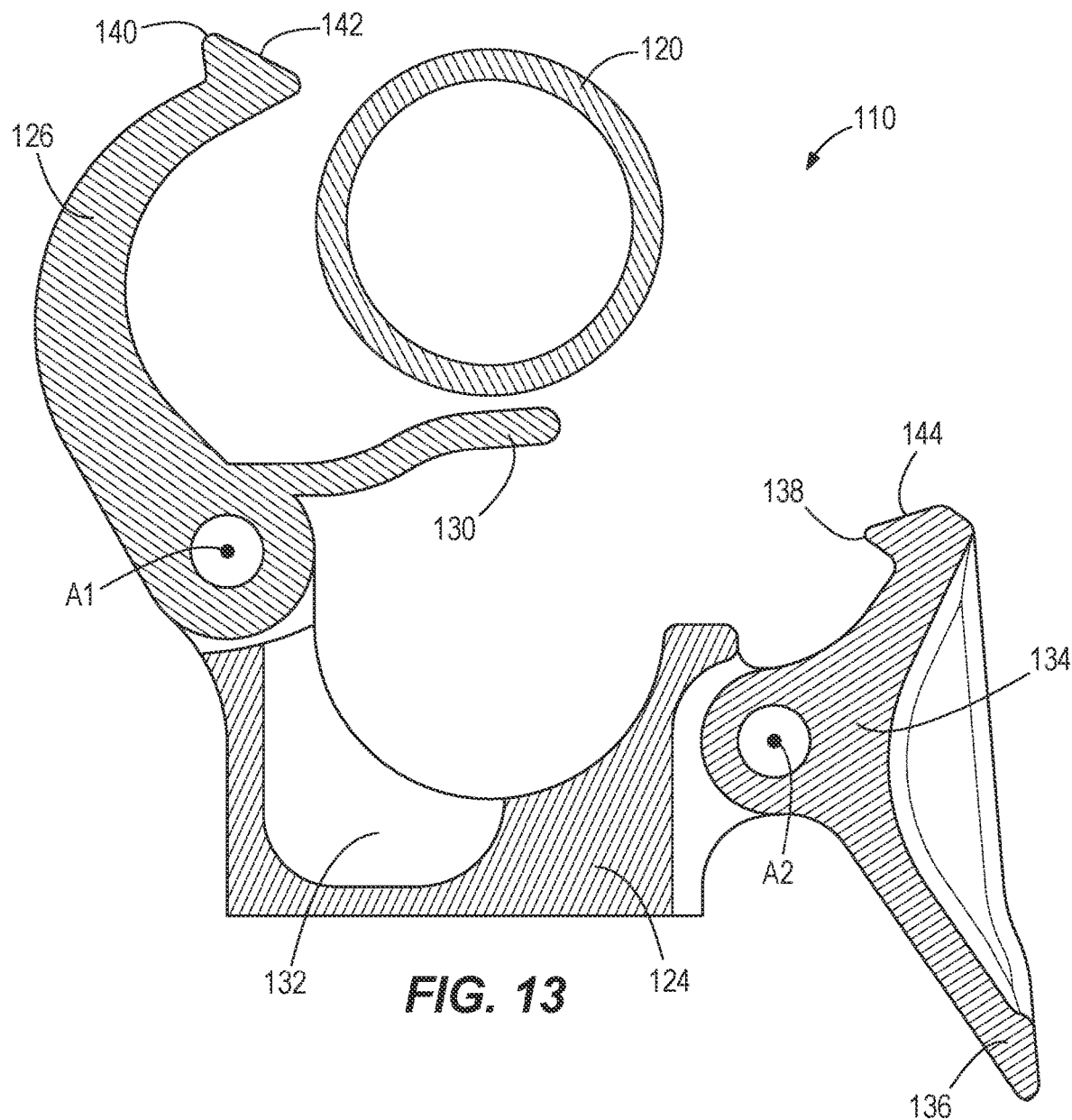
FIG. 13 is a side elevation cross-sectional view of the clamp assembly of FIG. 10 in the open position.

With reference to FIGS. 12 and 13, the clamp assembly 110 further includes an actuation finger 130 coupled to the clamp arm 126. The actuation finger 130 in the illustrated embodiment is rigidly coupled to the clamp arm 126 and, therefore, moves with the clamp arm 126. As shown progressively in FIGS. 13-16, the cross-member 120 of the handle 112 engages the actuation finger 130 as the handle 112 is inserted into the clamp assembly 110. This engagement of the actuation finger 130 causes the clamp arm 126 to pivot and capture the cross-member 120 as shown. The clamp arm 126 pivots about its rotational axis A1 toward the base 124 in a first rotational direction R1 and away from the base 124 in a second rotational direction R2. As shown in FIGS. 13-16, the actuation finger 130 is clear to pivot along with the clamp arm 126 by virtue of a recess 132 defined in the base 124.

Turning now to FIGS. 9 and 10, the clamp assembly also includes a user engagement portion 134. The user engagement portion 134 includes a tab 136 on which a user presses and a hook 138 for capturing the clamp arm 126. In the illustrated embodiment, the clamp arm 126 further includes a corresponding hook 140. The user engagement portion 134 is illustrated as being coupled to the base 124, but other embodiments may not include this feature. The user engagement portion 134 is rotatable relative to the base 124 with a pivotable connection in the illustrated embodiment. Particularly, the user engagement portion 134 pivots about its rotational axis A2 toward the base 124 in a third rotational direction R3 and away from the base in a fourth rotational direction R4. In some embodiments, the user engagement portion 134 is biased in the third rotational direction R3 by a bias, such as a torsion spring that surrounds a portion of the rotational axis A2. In this manner, the user may actuate the user engagement portion 134 to open it by pressing down on the tab 136 against the bias of the torsion spring, thereby moving the user engagement portion 134 in the fourth rotational direction R4. Upon the user releasing pressure from the tab 136, the torsion spring moves the user engagement portion 134 closed in the third rotational direction R3. In the illustrated embodiment, the first rotational direction R1 and the third rotational direction R3 are rotationally opposite directions, and the second rotational direction R2 and the fourth rotational direction R4 are rotationally opposite directions.

Also in the illustrated embodiment, the clamp arm 126 and the user engagement portion 134 each have complementary outer faces 142, 144 such that closure of the clamp assembly 110 can occur without the user manually actuating the user engagement portion 134. Instead, the outer face 142 of the clamp arm 126 engages the outer face 144 of the user engagement portion 134, thereby pressing into the outer face 144 of the user engagement portion 134. This pressing engagement causes the user engagement portion 134 to rotate in the fourth rotational direction R4 against the bias. Once the hooks 138, 140 clear each other, the outer faces 142, 144 are no longer in contact, and the bias causes the user engagement portion 134 to rotate in the third rotational direction R3, thereby capturing the clamp arm 126 in the closed position.

With the arrangement described above, the clamp assembly 110 can capture and release the cross-member 120 of the handle 112. In the illustrated embodiment, both a passage 146 defined by the clamp assembly 110 and the cross-member 120 have complementary radially symmetrical cross-sections, such that the clamp assembly 110 can capture the cross-member 120 with the handle 112 in multiple rotational positions. In the illustrated embodiment, the passage 146 and the cross-member 120 are circular in cross-section, although other embodiments may include triangular, rectangular, pentagonal, hexagonal, or the like cross-sections.

Figure 2:
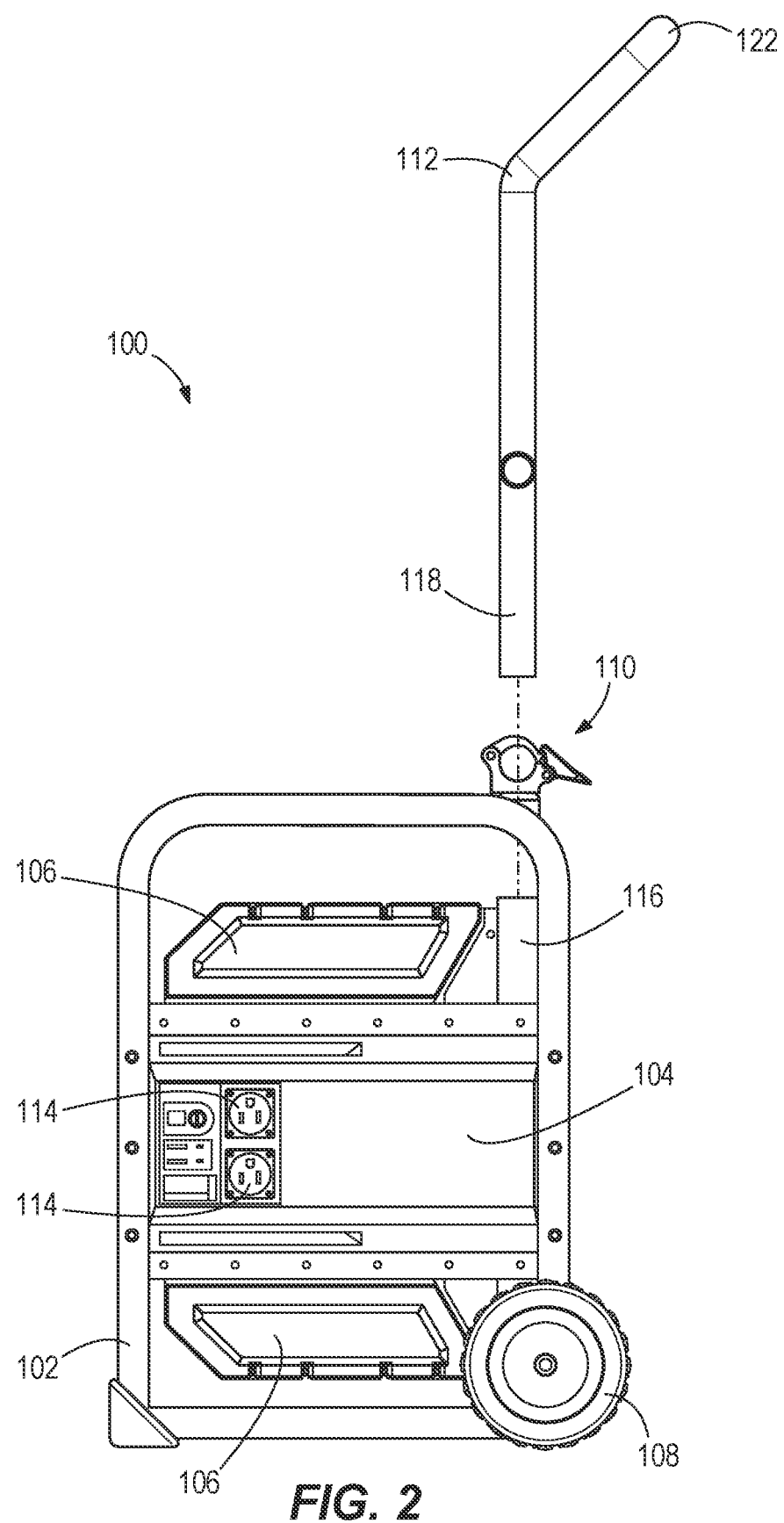
FIG. 2 is a side elevation view of mobile power supply of FIG. 1 with the handle removed from the frame.

With reference to FIGS. 1, 2, and 9, the mobile power supply 100 further includes two mounts 116 that are spaced from each other. In the illustrated embodiment, the mounts 116 include respective female passages 148. The female passages 148 are configured to removably receive the male ends of the two elongate members 118 of the handle 112. In other embodiments, the elongate members 118 may be female and the mounts 116 may be male. In still other embodiments, other fastening methods may be used to removably connect the mounts 116 to the elongate members 118. The mounts 116 may be coupled directly to the frame 102 and/or coupled directly to the body 104. In some embodiments, the mounts 116 may be coupled directly to the body 104 only and, therefore, indirectly to the frame 102. Although not shown, detent mechanisms such as spring-loaded pins or the like may be used to retain the elongate members 118 in the mounts 116 until a user manually releases the connection. Other embodiments may rely solely on the clamp assembly 110 capturing the cross-member 120 to hold the handle 112 in the operation configuration. Due to the distance between the clamp assembly 110 and the mounts 116 being shorter than the distance between the cross-member 120 and the ends of the elongate members 118, the elongate members 118 can be removed from the mounts 116 only if the clamp assembly 110 releases the cross-member 120 and the cross-member 120 is completely removed from the clamp assembly 110.

Figure 14:
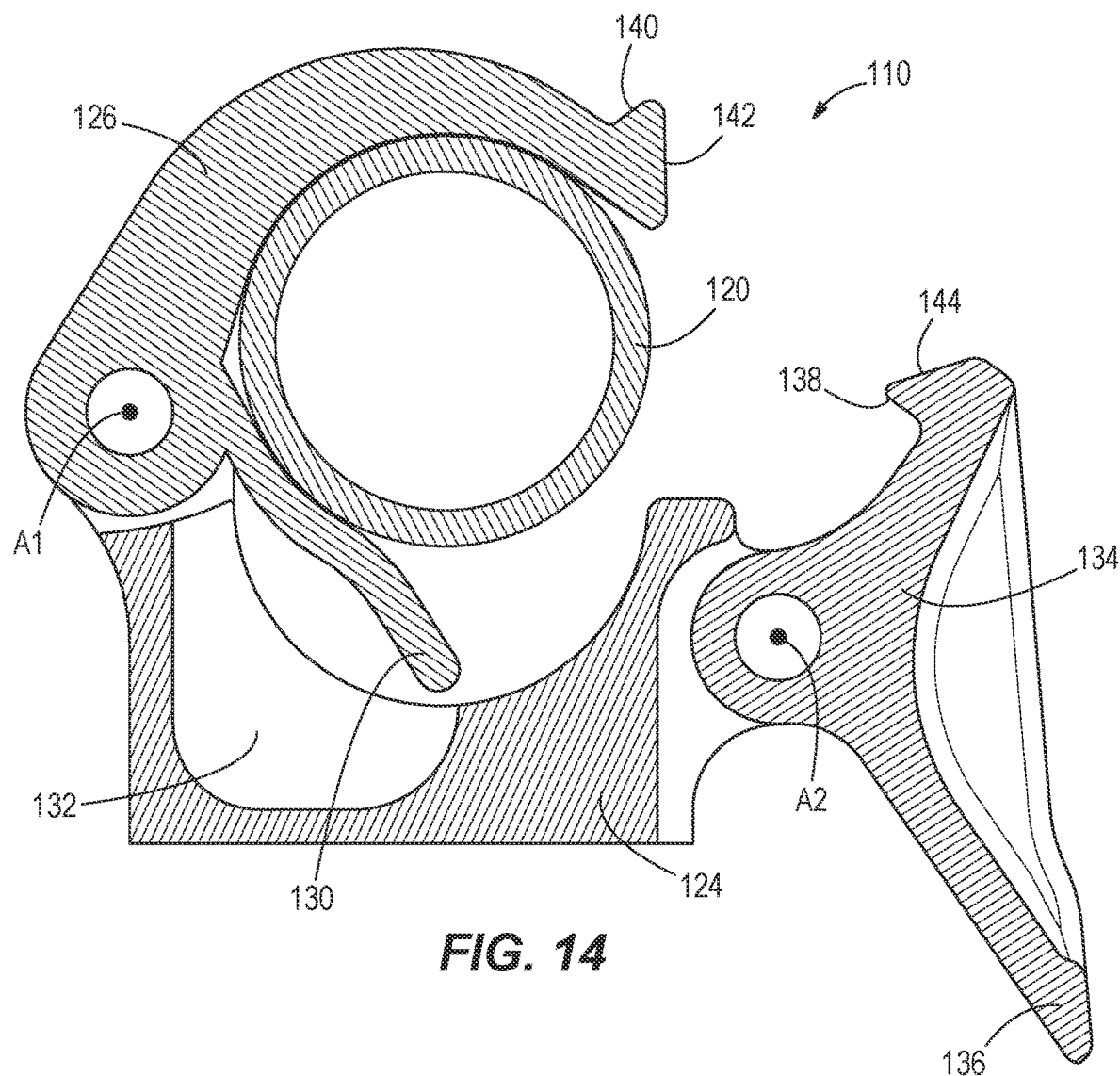
FIG. 14 is a side elevation cross-sectional view of the clamp assembly of FIG. 10 with a cross-member disposed partially therein, the clamp assembly in an intermediate position.
Figure 15:
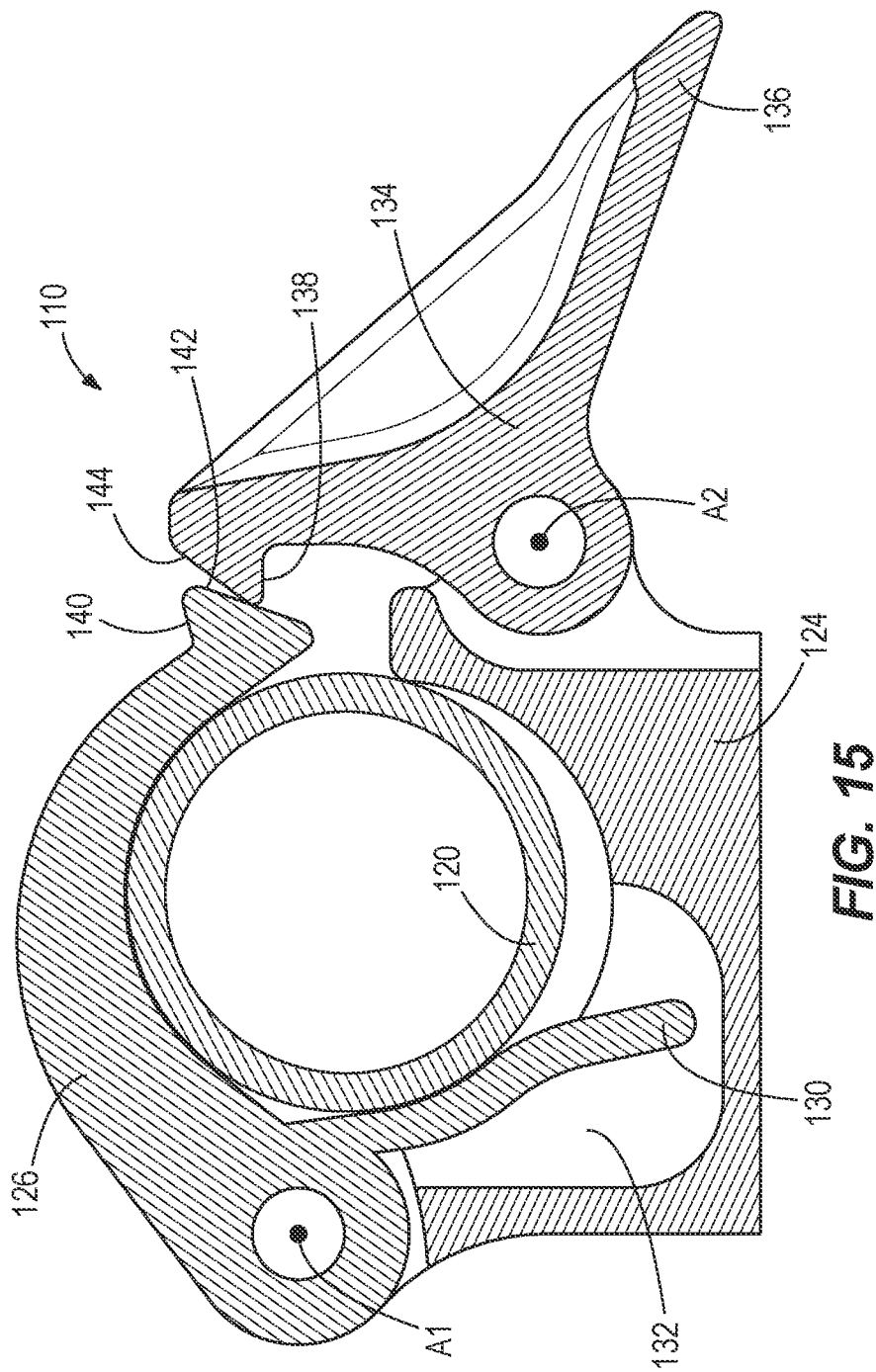
FIG. 15 is a side elevation cross-sectional view of the clamp assembly of FIG. 10 with a cross-member disposed therein, the clamp assembly in another intermediate position.
Figure 16:
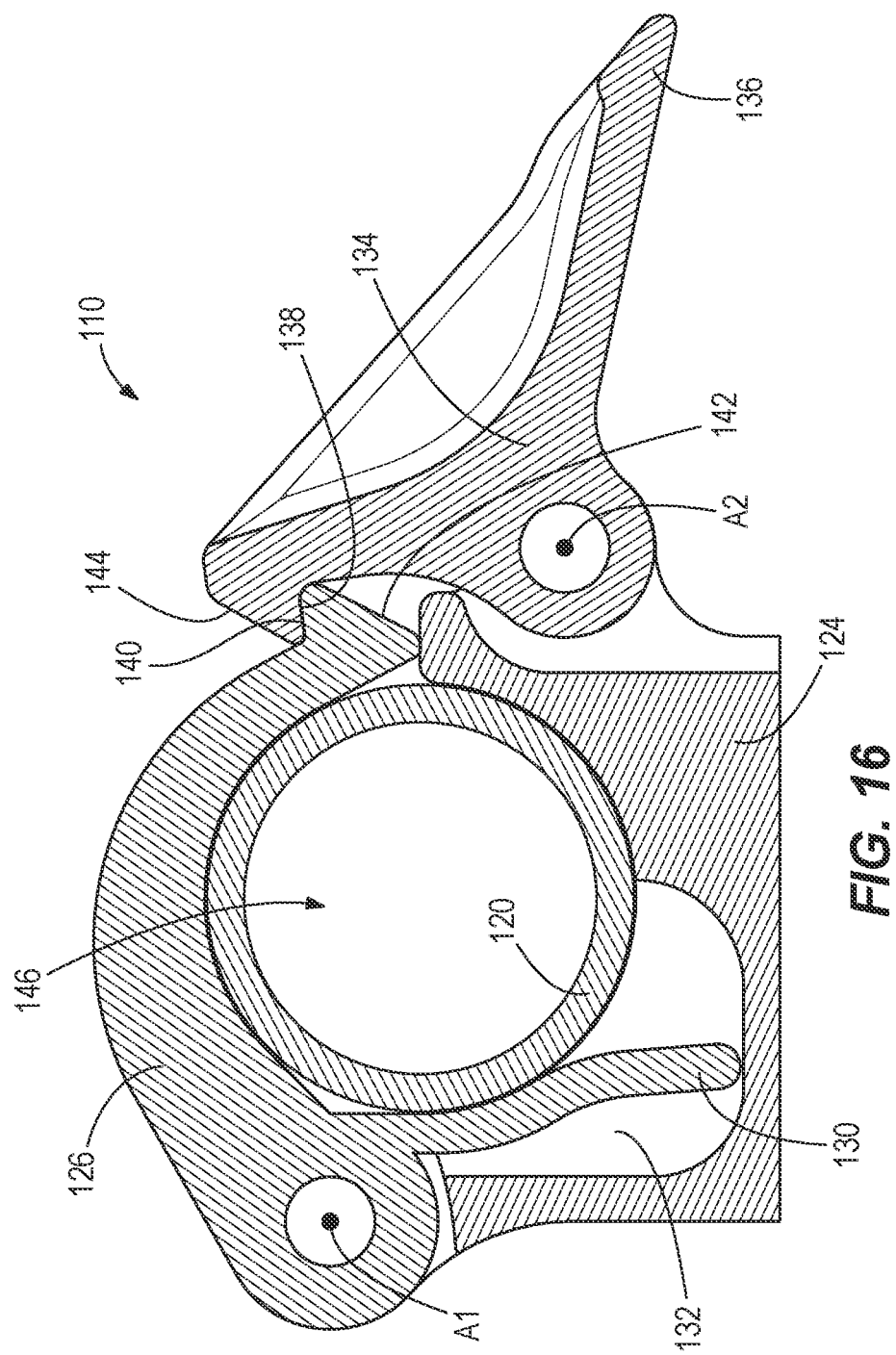
FIG. 16 is a side elevation cross-sectional view of the clamp assembly of FIG. 10 with a cross-member disposed therein, the clamp assembly in a closed position.
Figure 17:
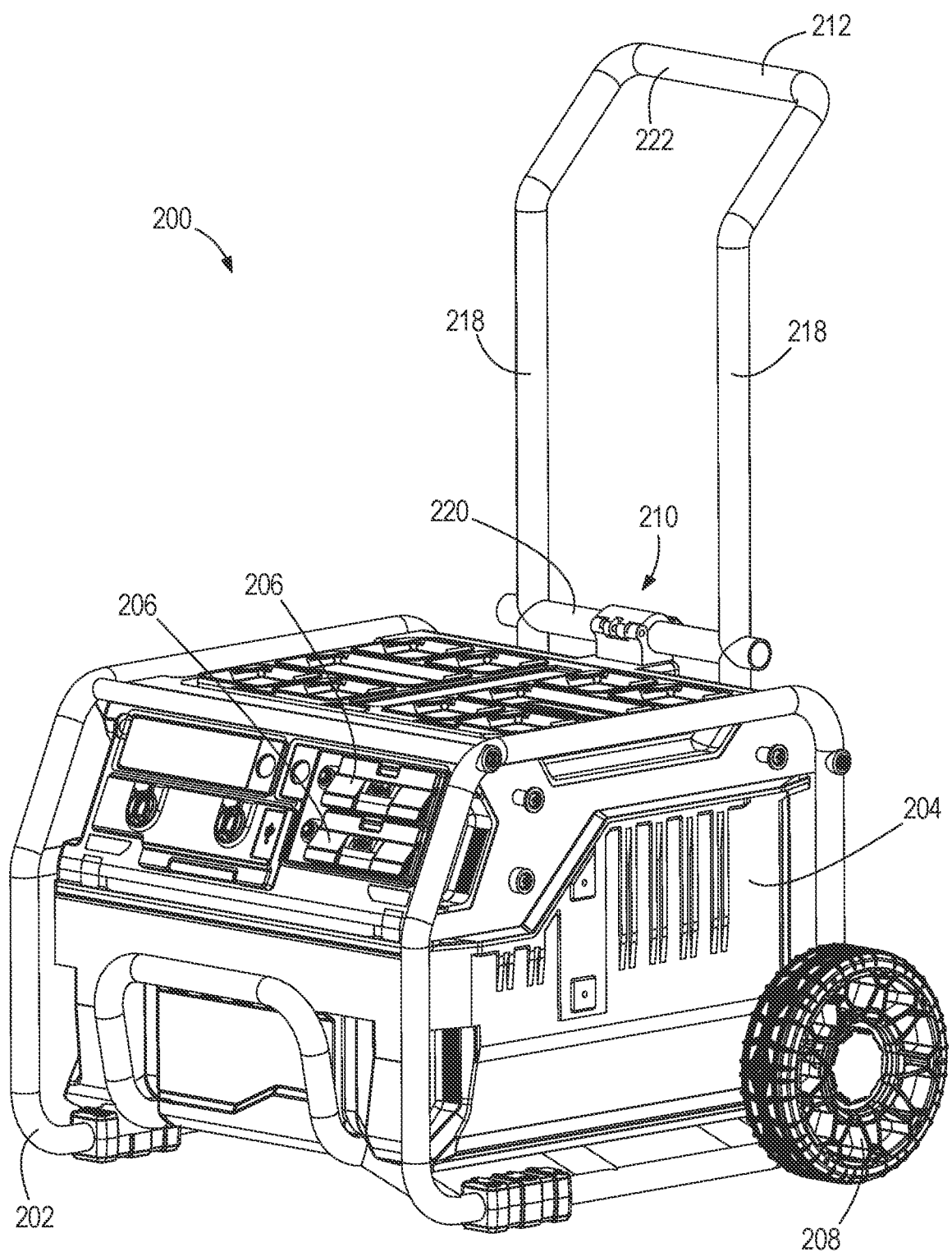
FIG. 17 is a front perspective view of a mobile power supply with the handle in an operation configuration, according to embodiments disclosed herein.
Figure 18:
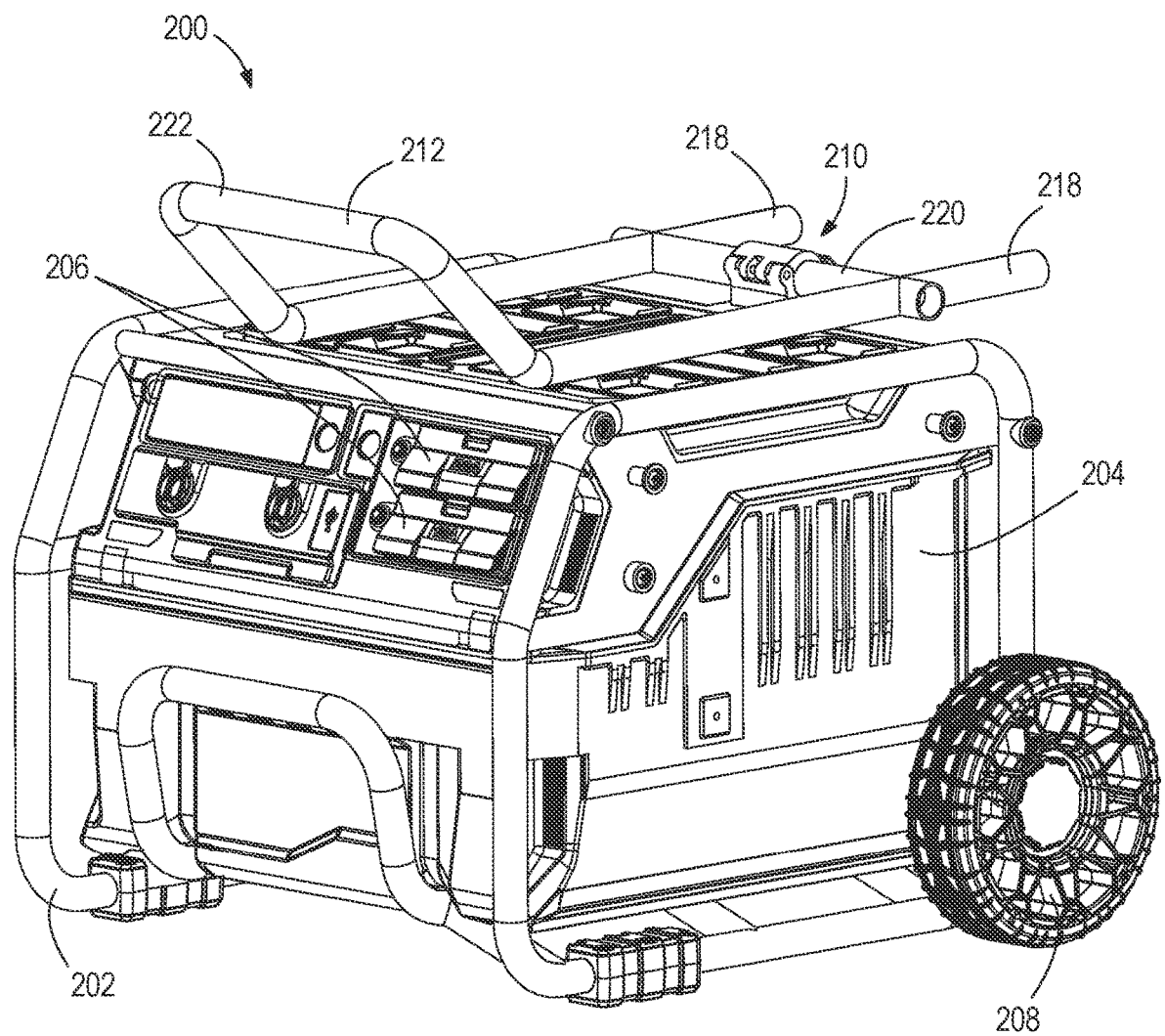
FIG. 18 is a front perspective view of the mobile power supply of FIG. 17 with the handle in a storage configuration.
Figure 19:
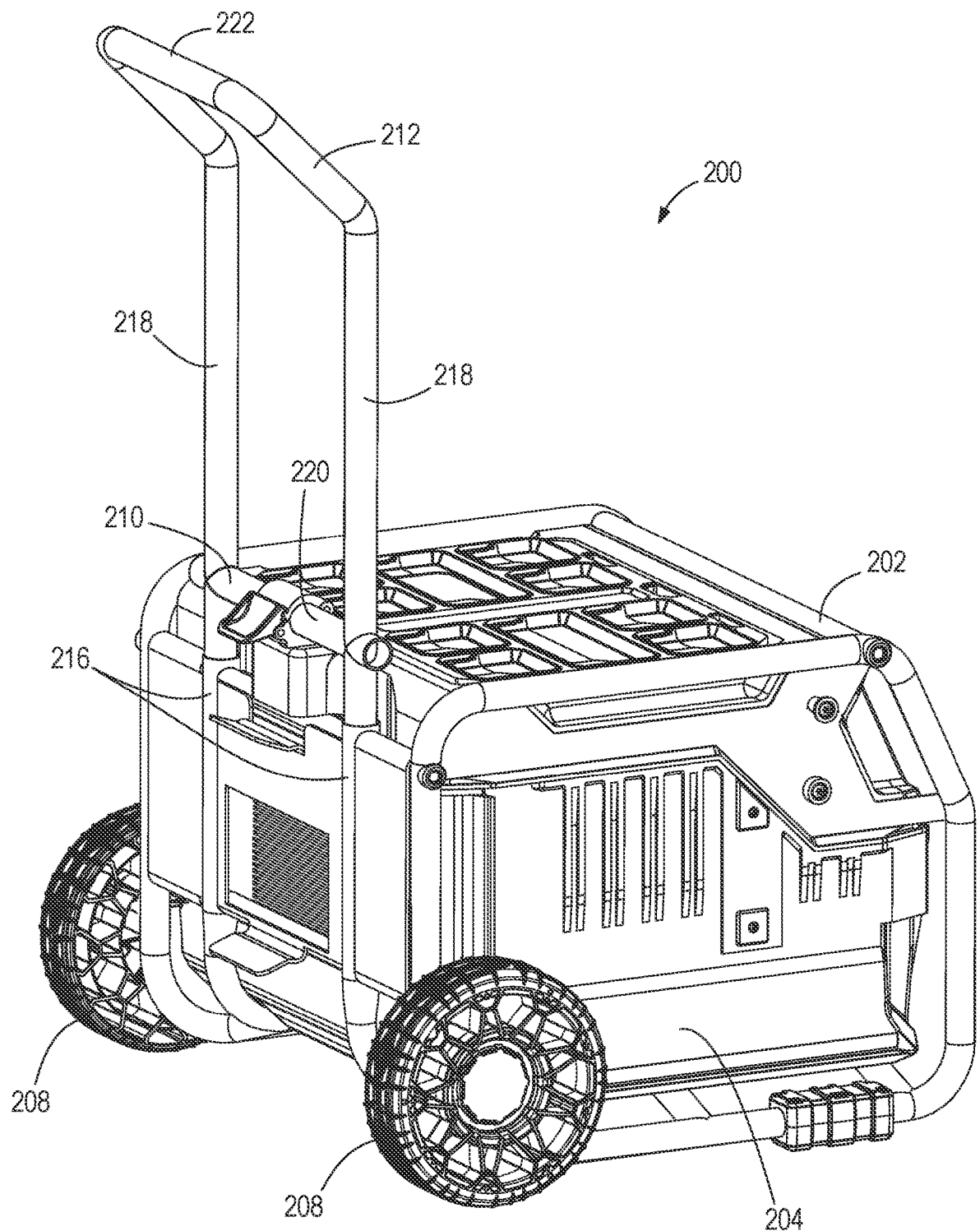
FIG. 19 is a rear perspective view of the mobile power supply of FIG. 17 with the handle in the operation configuration.
Figure 20:
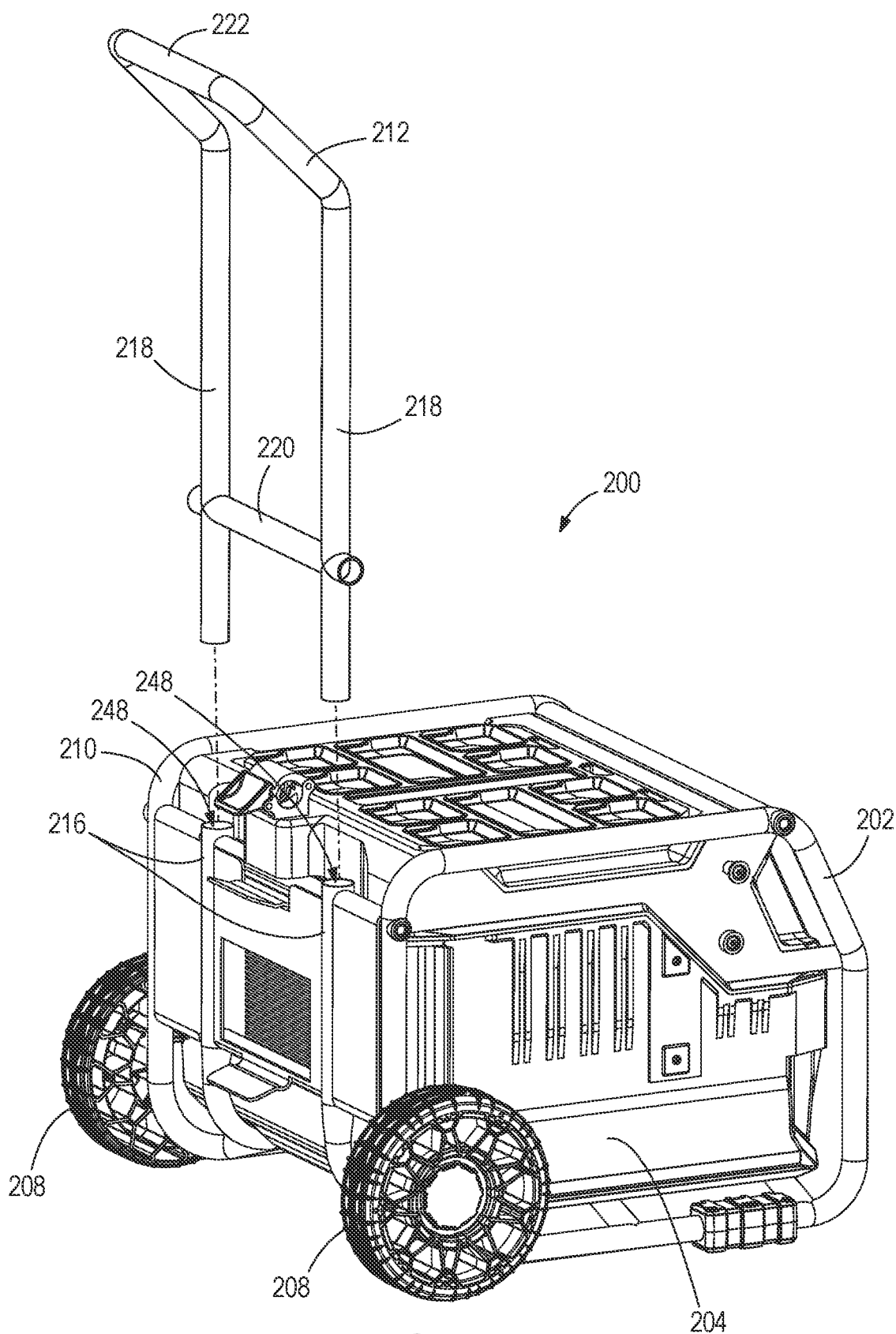
FIG. 20 is a rear perspective view of the mobile power supply of FIG. 17 with the handle removed from the frame.
Figure 21:
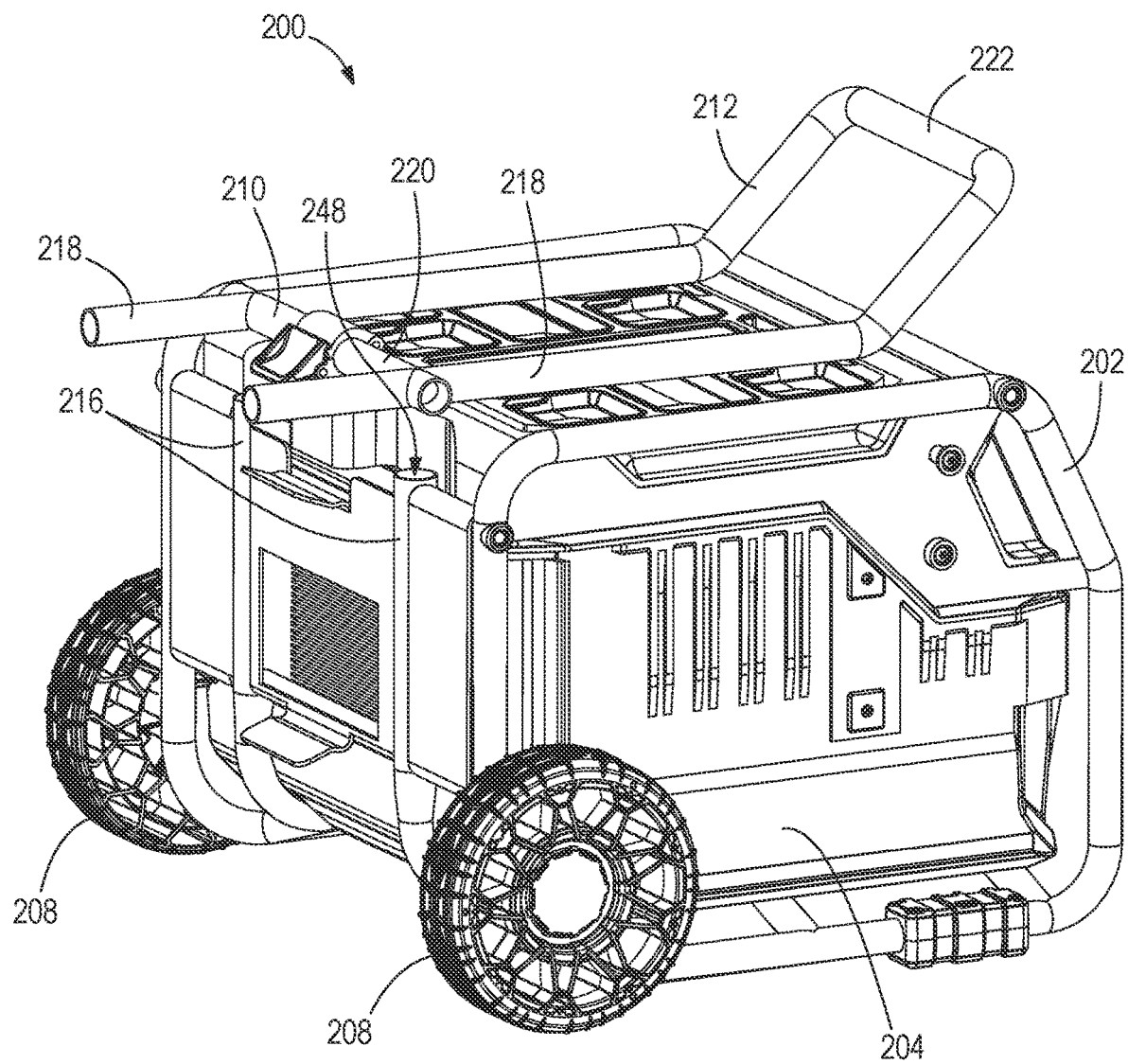
FIG. 21 is a rear perspective view of the mobile power supply of FIG. 17 with the handle in the storage configuration.
Figure 22:
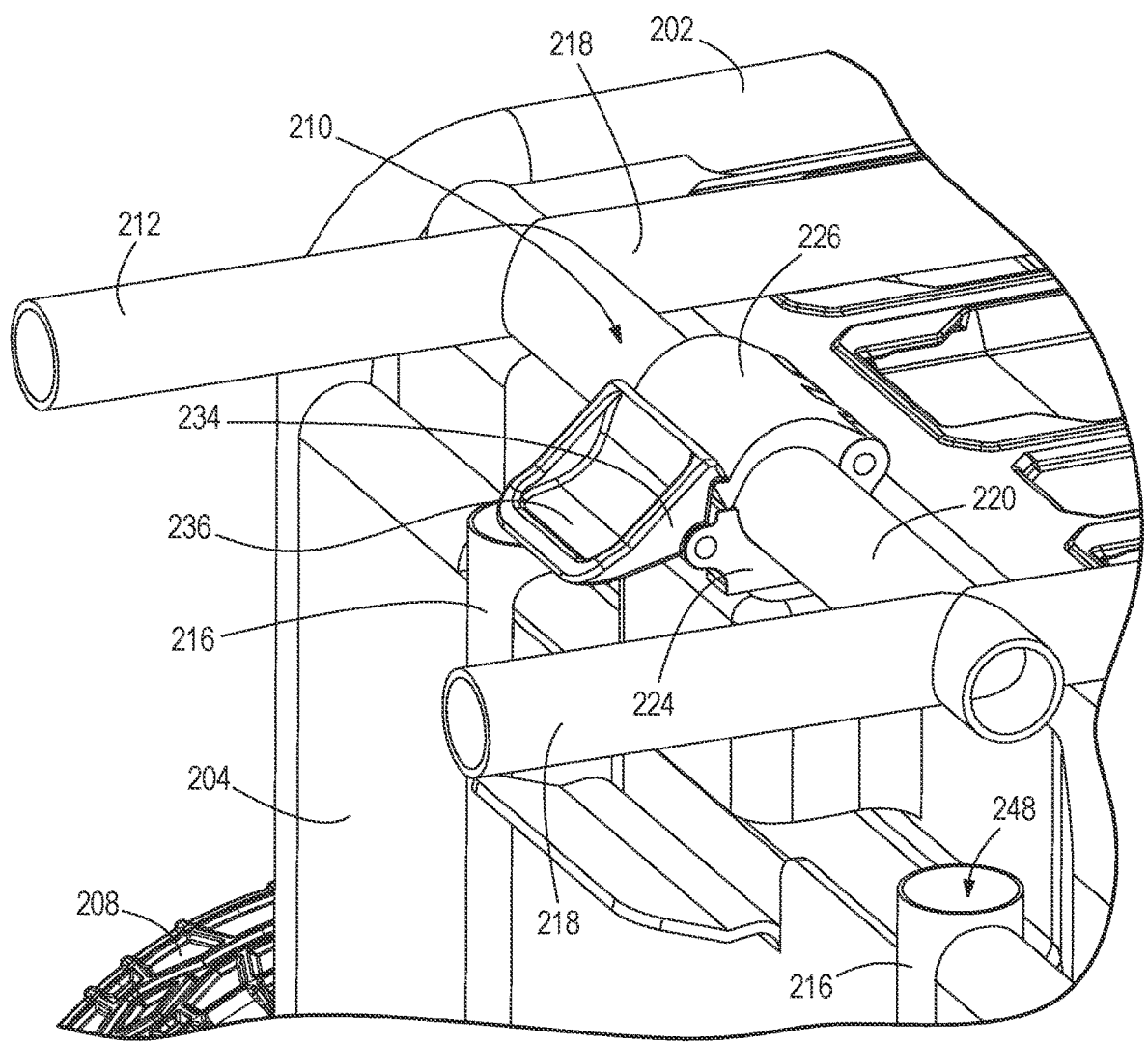
FIG. 22 is a detailed rear perspective view of the mobile power supply of FIG. 17 with the handle in the storage configuration.
Figure 23:
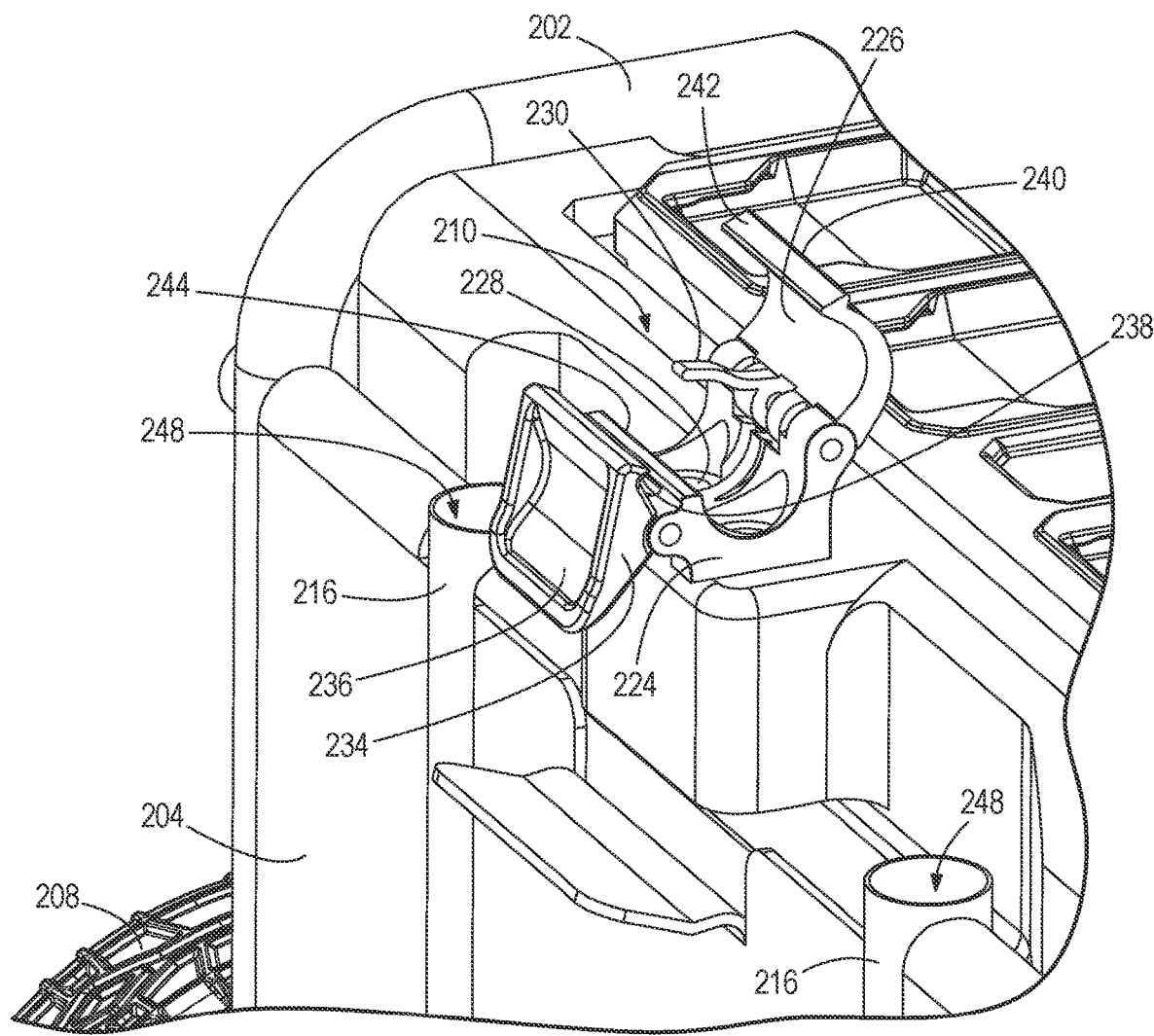
FIG. 23 is a detailed rear perspective view of a clamp assembly on the mobile power supply of FIG. 17 with the handle removed.

The present disclosure also contemplates a method of using the mobile power supply 100. In some embodiments, the mobile power supply 100 may have the handle 112 in the operation configuration, as shown in FIG. 1. A user actuates the user engagement portion 134 of the clamp assembly 110 by pressing on the tab 136 against the bias of a torsion spring. This action allows the user to remove the cross-member 120 of the handle 112 from the clamp assembly 110 by pulling up on the handle 112 by, for instance, the gripping portion 122. Pulling the handle 112 away from the frame 102 causes the cross-member 120 to push the clamp arm 126 rotationally away from the base 124 of the clamp assembly 110, thereby rotating the clamp arm 126 in the second rotational direction R2. Once the handle 112 is released from the clamp assembly 110, the user may continue to pull the handle 112 away from the frame 102 until the elongate members 118 of the handle 112 are fully withdrawn from the mounts 116. At this point, the handle 112 is completely removed from the rest of the mobile power supply 100, as shown in FIGS. 2 and 3. The user may then manipulate the handle 112 to place the handle 112 in a desired orientation, such as that shown in either of FIG. 4 or FIG. 6. This manipulation of the handle 112 can be considered to be a rotation of the handle 112 relative to and separate from the frame 102, as well as the rest of the mobile power supply 100. The user then lowers the handle 112 down until the cross-member 120 of the handle 112 once again enters the space between the clamp arm 126 and the actuation finger 130 (FIG. 13). If the clamp arm 126 previously returned to the closed position, the user will have to engage the tab 136 of the user engagement portion 134 and lift the clamp arm 126 away to open the clamp assembly 110 prior to inserting the cross-member 120 between the clamp arm 126 and the actuation finger 130. The user continues to lower the handle 112 such that the cross-member 120 pushes the actuation finger 130, thereby pivoting the clamp arm 126 in the first rotational direction R1 (FIGS. 14-16). If the user is not holding the user engagement portion 134 open manually, the outer face 142 of the clamp arm 126 will engage the outer face 144 of the user engagement portion 134, thereby forcing the user engagement portion 134 to rotate in the fourth rotational direction R4 against the bias (FIG. 15). Once the handle 112 has been pushed far enough, the hook 138 of the user engagement portion 134 will pass over and trap the hook 140 of the clamp arm 126, thereby holding the clamp assembly 110 closed and capturing the cross-member 120 in the passage 146 until the user once again engages the tab 136 of the user engagement portion 134. The handle 112 is then in either the first storage configuration (FIG. 5) or the second storage configuration (FIG. 7) depending on the orientation of the handle 112 the user chose previously. Of course, some embodiments, particularly those utilizing triangular, rectangular, etc. cross-sections, could have more than these two storage configurations available. Further, this circular cross-section embodiment illustrated herein may allow the handle 112 to pivot relative the clamp assembly 110 in the storage configuration. Other embodiments may prevent such rotation with additional structures.

The method may also be performed in reverse order to move the handle 112 from either of the first and second storage configurations (FIGS. 5 and 7) to the operation configuration (FIG. 1). The user would additionally line up the elongate members 118 with, and at least partially insert them into, the corresponding mounts 116 prior to inserting the cross-member 120 of the handle 112 into the space between the clamp arm 126 and the actuation finger 130 of the clamp assembly 110 when placing the handle 112 in the operation configuration (FIG. 1).

FIGS. 17-23 illustrate another embodiment of a mobile power supply 200. Many features of the mobile power supply 200 are similar to those discussed above with respect to the mobile power supply 100 of FIGS. 1-16. These similar features may not be explicitly discussed herein but are denoted with a reference number that is a value of one hundred higher than the corresponding features of the mobile power supply 100 of FIGS. 1-16.

The mobile power supply 200 is similar to the mobile power supply shown in FIGS. 1-16, except that the cross-member 220 is spaced further from the handle 212 than the crossmember 120 is spaced from the handle 112. The crossmember 220 is closer the free ends of the two elongate members 218. In the storage configurations, the free ends of the elongate members 118 extend a further distance past the body 104 of the mobile power supply 100 compared to the distance the free ends of the elongate members 218 extend past the body 204 of the mobile power supply 200.

Various features of the disclosure are set forth in the following claims.

What is claimed is:

1. A mobile power supply comprising:
a frame;
at least one battery pack supported by the frame;

a clamp assembly coupled to the frame;
a handle removably attached to the frame, the handle including two elongate members spaced apart from one another, and a cross-member extending between the two elongate members; and
wherein the clamp assembly is configured to capture the cross-member with the handle in an operation configuration, release the cross-member to move the handle from the operation configuration to a storage configuration, and capture the cross-member with the handle in the storage configuration.

2. The mobile power supply of claim 1, wherein the clamp assembly includes a user engagement portion for opening the clamp assembly.

3. The mobile power supply of claim 2, wherein actuation of the user engagement portion opens the clamp assembly against a bias.

4. The mobile power supply of claim 2, wherein
the clamp assembly further includes a base, and
the user engagement portion moves rotatably relative to the base.

5. The mobile power supply of claim 4, wherein the clamp assembly further includes a clamp arm pivotably connected to the base.

6. The mobile power supply of claim 5, wherein the clamp assembly further includes an actuation finger coupled to the clamp arm and movable with the clamp arm, the actuation finger configured to be engaged by the cross-member of the handle.

7. The mobile power supply of claim 5, wherein the clamp arm pivots away from the base in a first pivot direction and the user engagement portion moves rotatably away from the base in a second pivot direction, the second pivot direction being opposite the first pivot direction.

8. The mobile power supply of claim 1, further comprising two mounts coupled to the frame, the two mounts spaced relative to one another and configured to removably couple the two elongate members to the frame.

9. The mobile power supply of claim 8, wherein the two mounts include two female passages, each female passage configured to removably receive an end of a respective one of the two elongate members of the handle.

10. The mobile power supply of claim 1, wherein the handle further includes a gripping portion, the gripping portion being closer to the frame with the handle in the storage configuration than with the handle in the operation configuration.

11. The mobile power supply of claim 1, further comprising at least one wheel coupled to the frame.

12. A mobile power supply comprising:
a frame;
at least one battery pack supported by the frame;
a clamp assembly including a base coupled to the frame;
a handle positionable in an operation configuration and a storage configuration relative to the frame, the handle including a cross-member;
wherein the clamp assembly is configured to removably capture the cross-member of the handle with the handle in each of the operation configuration and the storage configuration; and
wherein the handle must be completely removed from the clamp assembly in order to move from the storage configuration to the operation configuration.

13. The mobile power supply of claim 12, further comprising
two mounts coupled to the frame; and
wherein the handle includes two elongate members, each elongate member configured to be received in a corresponding one of the two mounts with the handle in the operation configuration.

14. The mobile power supply of claim 13, wherein the elongate members can be removed from the mounts only if the cross-member of the handle is completely removed from the clamp assembly.

15. The mobile power supply of claim 12, wherein the handle is in a horizontal orientation in the storage configuration.

16. The mobile power supply of claim 12, wherein the handle is in an upright orientation in the operation configuration.

17. The mobile power supply of claim 12, wherein a height of the mobile power supply is greater with the handle in the operation configuration than in the storage configuration.

18. The mobile power supply of claim 12, wherein the handle includes two elongate members, each elongate member being perpendicular to the cross-member.

19. The mobile power supply of claim 12, wherein the handle includes a gripping portion, the gripping portion being parallel to the cross-member.

* * * * *